United States Patent [19]
Guillon

[11] Patent Number: 5,383,305
[45] Date of Patent: Jan. 24, 1995

[54] REINFORCEMENT FOR A SEALING STRIP AND A SEALING STRIP INCLUDING SUCH REINFORCEMENT

[75] Inventor: Henri Guillon, Saint-Maurice sur Fessard, France

[73] Assignee: Hutchinson, Paris, France

[21] Appl. No.: 52,477

[22] Filed: Apr. 23, 1993

[30] Foreign Application Priority Data

Apr. 30, 1992 [FR] France ............... 92 05379

[51] Int. Cl.⁶ ............................................. E06B 7/16
[52] U.S. Cl. .................................... 49/440; 49/490.1; 49/475.1; 428/122
[58] Field of Search ............. 49/440, 441, 490.1, 49/475.1, 495.1, 489.1; 428/122, 358

[56] References Cited

U.S. PATENT DOCUMENTS

| 4,074,465 | 2/1978 | Bright | 49/440 X |
|---|---|---|---|
| 4,099,765 | 7/1978 | Bright | 49/440 X |
| 4,442,156 | 4/1984 | Yamaguchi | 49/475.1 X |
| 4,517,233 | 5/1985 | Weichman | 428/122 X |
| 4,678,696 | 7/1987 | Maeno et al. | 49/495.1 X |
| 4,835,031 | 5/1989 | Schröder et al. | 428/122 |
| 4,943,335 | 7/1990 | Schröder et al. | 428/122 X |
| 5,050,349 | 9/1991 | Goto et al. | 49/489.1 |
| 5,194,312 | 3/1993 | Verig | 49/490.1 X |

FOREIGN PATENT DOCUMENTS

| 127591 | 5/1984 | European Pat. Off. . |
|---|---|---|
| 267073 | 10/1987 | European Pat. Off. . |
| 282918 | 3/1988 | European Pat. Off. . |
| 376764 | 10/1989 | European Pat. Off. . |
| 416433(A3) | 8/1990 | European Pat. Off. . |
| 416433(A2) | 8/1990 | European Pat. Off. . |
| 3025085 | 5/1990 | Germany ............... 49/490.1 |
| 768523 | 2/1957 | United Kingdom . |
| 2184398 | 6/1987 | United Kingdom . |

*Primary Examiner*—Peter M. Cuomo
*Assistant Examiner*—Jerry Redman
*Attorney, Agent, or Firm*—Harry M. Weiss

[57] ABSTRACT

The invention relates to reinforcement for a sealing strip and to a sealing strip including such reinforcement. The essential characteristic of the present invention lies in superposing webs that interconnect rung members of the reinforcement so as to facilitate bulging or edgewise bending of the reinforcement and of the sealing strip. The invention is mainly applicable to providing sealing in the motor industry.

7 Claims, 2 Drawing Sheets

REINFORCEMENT FOR A SEALING STRIP AND A SEALING STRIP INCLUDING SUCH REINFORCEMENT

The invention relates mainly to reinforcement for a sealing strip and to a sealing strip including such reinforcement.

BACKGROUND OF THE INVENTION

In conventional manner in the automobile industry, sealing is provided between a window glass and a window frame of a vehicle door, for example, by means of a sealing strip made of elastomer, in particular rubber, and including metal reinforcement.

For technical reasons and/or for reasons of appearance, motor vehicle manufacturers seek to give vehicles shapes that are very aerodynamic. These generally-rounded shapes are usually characterized by the absence of any sharp angles. As a result, window glasses and the window frames of doors are curved, which gives rise to considerable bulging or edgewise bending of sealing strips such that they no longer provide the desired sealing.

OBJECTS AND SUMMARY OF THE INVENTION

Consequently, an object of the present invention is to provide metal reinforcement for a sealing strip which not only stiffens the strip in a desired manner, but also provides little resistance to bulging and/or bending of the strip so as to enable said bulging or bent shape to be conserved.

Another object of the present invention is provide a sealing strip, in particular for a motor vehicle, which is suitable for being given bulging or bent shapes of large or medium radii of curvature without using special tooling.

Finally, an object of the present invention is to provide a sealing strip, in particular for a motor vehicle, which is suitable for being given a bulging or bent shape by means of tooling that folds it about a small radius of curvature.

The present invention mainly provides a reinforcement for a sealing strip, in particular for a motor vehicle, the reinforcement comprising a metal strip comprising rung members that are interconnected by at least two interconnecting webs, wherein the reinforcement is folded so as to include at least one superposition of at least two webs for a given pair of adjacent rung members so as to facilitate bulging and edgewise bending of the reinforcement.

The invention also provides reinforcement wherein all of the interconnecting webs of the metal strip are superposed.

The invention also provides reinforcement wherein it is given the shape of the Greek letter "$\mu$".

The invention also provides a sealing strip for a vehicle, in particular a motor vehicle, for providing sealing between a glass and a frame of a door, the sealing strip including reinforcement of the invention.

The invention also provides a sealing strip, wherein it is substantially H-shaped.

The invention also provides a sealing strip, including a tube, in particular an elongate tube, situated inside an external upright of the H-shape.

The invention also provides a sealing strip, including sealing lips of a slideway for providing sealing against opposite faces close to the free edge of a glass, typically the top edge thereof, said lips stemming from the bottom ends of the external and internal uprights of the H-shape and penetrating into the bottom groove thereof, and including a top groove for receiving a portion of the frame of the door.

The invention also provides a sealing strip, wherein said strip bulges.

The invention also provides a sealing strip, wherein said strip is bent edgewise.

BRIEF DESCRIPTION OF THE DRAWINGS

The invention will be better understood from the following description and the accompanying figures which are given by way of non-limiting example, and in which:

In FIGS. 1 to 3, the same reference numbers designate the same elements, and parts made of elastomer are shown in their un-stressed condition, as is conventional in the rubber industry.

MORE DETAILED DESCRIPTION

Figure 1:
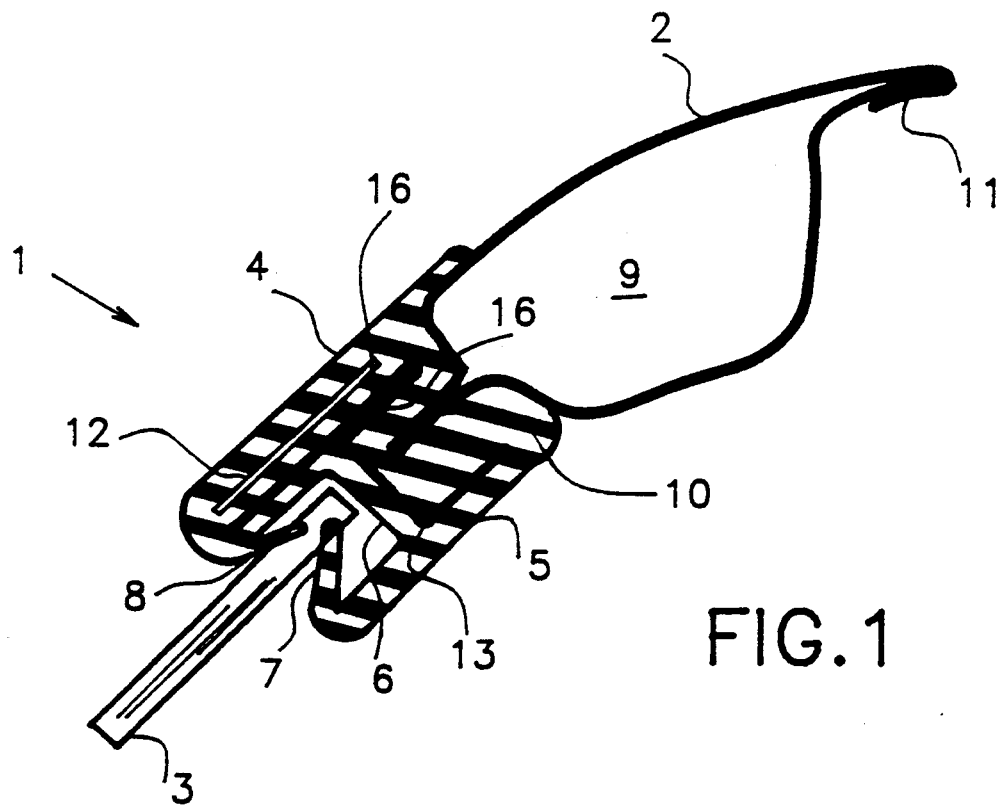
FIG. 1 is a section view through an embodiment of a sealing strip of the present invention.

FIG. 1 shows a sealing strip 1 of the present invention for providing sealing between the frame 2 of a door and a window glass 3. The strip 1 is generally H-shaped having an external upright 4 and an internal upright 5 that are interconnected by a crossbar 6. Two lips 7 and 8 stem from the bottom ends of the uprights 4 and 5 of the H-shape, penetrating into the bottom groove of the H-shape and forming a slideway that provides sealing against the two opposite faces close to the free edge (typically the top edge) of the glass 3. The frame 2 of the door shown in FIG. 1 comprises two pieces of sheet metal defining a box section 9 and interconnected at respective pairs of margins 10 and 11. The bottom margins 10 of the sheets making up the frame 2 of the the top ends of the uprights 4 and 5 of the H-shape being a close fit over the outside shape of the box section 9. An elongate tube 12 is provided in the external upright 4 of the H-shape.

Figure 2:
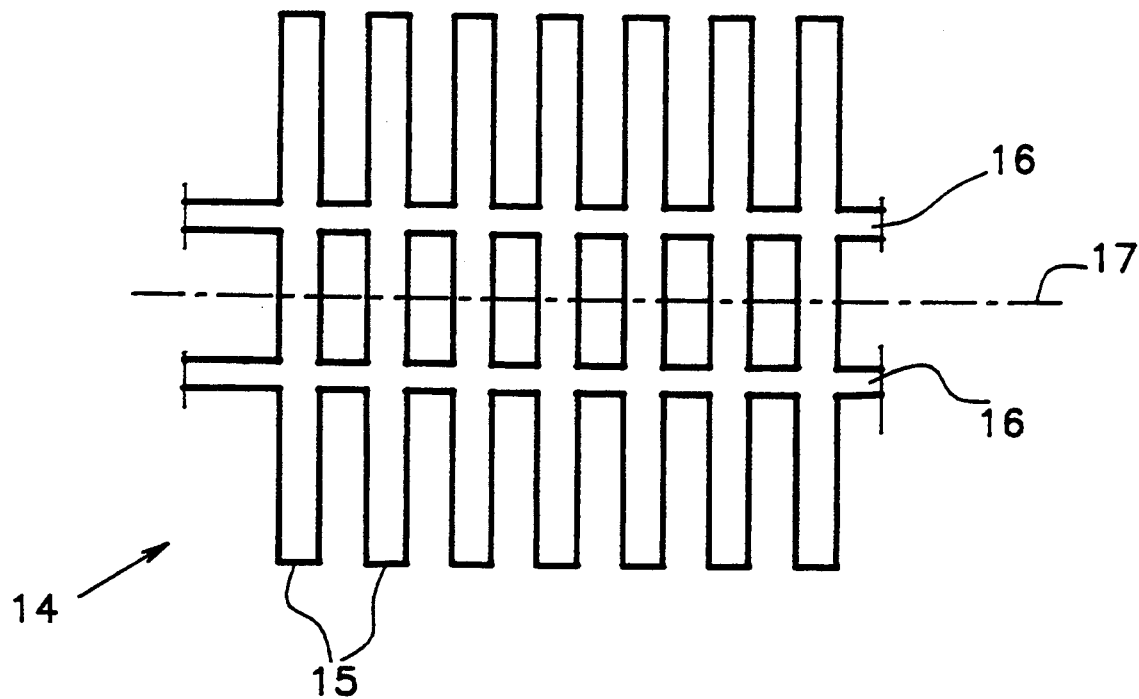
FIG. 2 is a plan view of a metal strip suitable for being folded to constitute reinforcement of the present invention.

The sealing strip 1 of the present invention includes reinforcement 13 that is shaped like the Greek letter "$\mu$", and stiffening the external upright 4, the crossbar 6, and the upper portion of the internal upright 5 of the H-shape. The reinforcement is made by folding a metal strip as shown in FIG. 2, which strip includes a series of elongate rung members 15 that are advantageously rectangular in shape and that are interconnected by two webs 16. The presence of a plurality of webs 16 may hinder bulging and above all edgewise bending of the reinforcement 13. An essential characteristic of the invention lies in at least two webs 16 being superposed during folding of the metal strip 14, e.g. about the axis 17. Advantageously, all of the webs of a given pair of adjacent rung members are superposed, forming a single superposition or a plurality of superpositions. Two superposed webs 16 provide cohesion for the reinforcement 13 while providing much less resistance to deformation due to bulging or edgewise bending than would be provided by two webs 16 that remain at a distance apart. As a result, the sealing strip 1 of the present invention can easily follow the outline of the window in a motor vehicle. For a large radius of curvature which is typically greater than or equal to 400 mm, or for a medium radius of curvature which is typically equal to 200 mm, imparting a bulging or a bent shape to a sealing strip 1 that includes at least one pair of webs does not require the use of special tools. To center a sealing strip 1 of the present invention about a radius of curvature that is very small, it is possible to use tooling, e.g. a pair of pliers adapted to the curvature which is to be imparted to the sealing strip.

Figure 3:
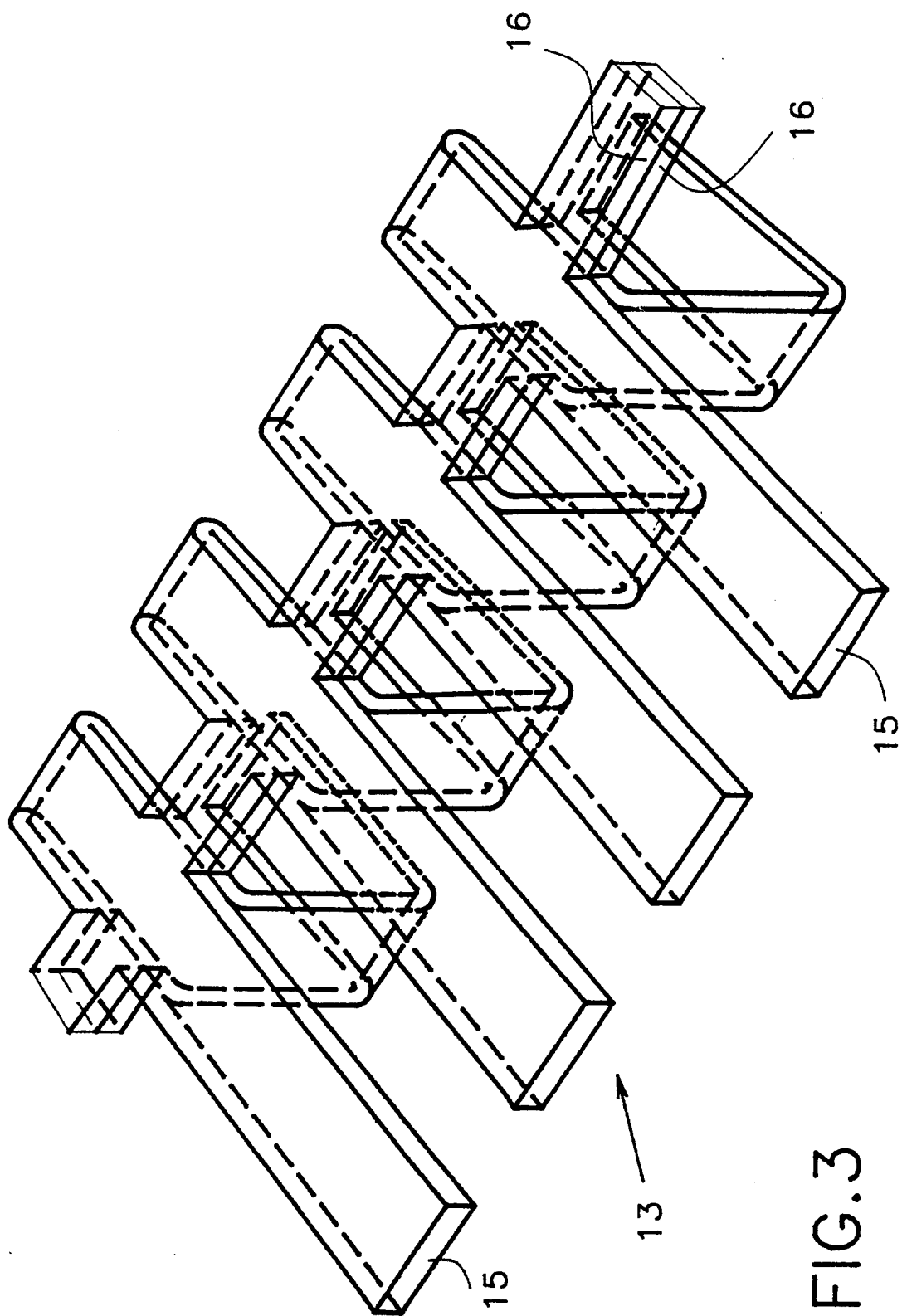
FIG. 3 is a perspective view of the above embodiment of reinforcement of the present invention.

FIG. 3 shows a short length of reinforcement 13 made up of two rung members 15 curved to take up a $\mu$-shape. In the variant shown in FIG. 3, the rung members 15 are connected together by a single superposition of two webs 16.

The invention is naturally not limited to the $\mu$-shape for the reinforcement 13 or to the H-shape for the sealing strip 1. Any reinforcement 13 including the essential characteristic of the present invention, namely superposition of webs 16, comes within the ambit of the present invention. The same applies to any sealing strip 1 including such reinforcement 13. In particular, the invention is not limited in any way to a sealing strip between a glass 3 and a frame 2 of a door.

The strip 1 is advantageously made of one or more elastomer type materials that are shaped by being extruded or co-extruded around the reinforcement 13 so as to make up a unitary assembly that is advantageously in the form of a single piece.

I claim:

1. Reinforcement for a sealing strip, in particular for a motor vehicle, the reinforcement comprising a metal strip comprising rung members that are interconnected by at least two interconnecting webs, wherein the reinforcement is folded so as to include at least one superposition along an entire length of at least two webs for a given pair of adjacent rung members so as to facilitate bulging and edgewise bending of the reinforcement.

2. Reinforcement according to claim 1, wherein all of the interconnecting webs of the metal strip are superposed.

3. Reinforcement according to claim 1, wherein said reinforcement is given the shape of the Greek letter "$\mu$".

4. Reinforcement according to claim 1 wherein said sealing strip provides sealing between a glass and a frame of a door, the sealing strip having said reinforcement located within said sealing strip.

5. Reinforcement according to claim 4, wherein said sealing strip is substantially H-shaped.

6. Reinforcement according to claim 5, including a tube, in particular an elongate tube, situated inside an external upright of the H-shaped sealing strip.

7. Reinforcement according to claim 5, said strip including sealing lips of a slideway for providing sealing against opposite faces close to a free edge of a glass, typically a top edge thereof, said lips stemming from bottom ends of external and internal uprights of a H-shape and penetrating into the bottom groove thereof, and including a top groove for receiving a portion of the frame of the door.

* * * * *